United States Patent [19]

Strom et al.

[11] Patent Number: 5,081,160

[45] Date of Patent: Jan. 14, 1992

[54] METHOD OF PREPARING UNIFORM SIZE ION EXCHANGE RESIN PARTICLES BY PARTIAL FUNCTIONALIZATION

[75] Inventors: Robert M. Strom; William I. Harris; Antonio Dorta, all of Midland; Natalie N. Westphal, Auburn; Robert E. Gaidos, Midland, all of Mich.

[73] Assignee: The Dow Chemical Company, Midland, Mich.

[21] Appl. No.: 679,465

[22] Filed: Apr. 2, 1991

[51] Int. Cl.⁵ .......................... C08J 5/20; C08F 1/11
[52] U.S. Cl. ..................................... 521/29; 521/28; 521/30; 521/31; 521/32; 521/33; 521/36; 525/333.5; 525/333.6; 210/656
[58] Field of Search ...................... 521/29, 33, 36, 28, 521/30, 31, 32

[56] References Cited

U.S. PATENT DOCUMENTS

| | | |
|---|---|---|
| 2,500,149 | 3/1950 | Boyer .................................... 521/33 |
| 2,945,842 | 7/1960 | Eichorn ............................. 525/344 |
| 3,056,765 | 10/1962 | Cowherd et al. . |
| 3,102,782 | 9/1963 | Small . |
| 3,133,030 | 5/1964 | Wheaton et al. . |
| 3,252,921 | 5/1966 | Hansen . |
| 3,565,833 | 2/1971 | Battaerd . |
| 3,827,989 | 8/1974 | Scott . |
| 3,928,193 | 12/1975 | Melaja et al. . |
| 3,966,596 | 6/2976 | Stevens et al. . |
| 4,427,794 | 1/1984 | Lange et al. . |
| 4,444,961 | 4/1984 | Timm . |
| 4,543,261 | 9/1985 | Harmon et al. . |

FOREIGN PATENT DOCUMENTS

| | | |
|---|---|---|
| 0361685 | 4/1990 | European Pat. Off. |
| 208622A | 4/1984 | Fed. Rep. of Germany . |
| 871541 | 6/1961 | United Kingdom . |
| 1344706 | 1/1974 | United Kingdom . |

OTHER PUBLICATIONS

G. H. Fricke, "Characteristics of Partially Sulfonated Poly(Styrene-Meta-Divinylbenzene) Ion Exchange Resin Beads", (Ph.D. Dissertation No. 71-12,342 for Clarkson College of Technology 1971), pp. 42-63 and 152-161.

J. R. Parrish, "Superficial Ion-Exchange Chromatography" *Nature*, 207:402-403 (1965).

C. Horvath et al., "Column Design in High Pressure Liquid Chromatography" *J. Chrom. Sci*, 7:109-116, (1969).

L. C. Hansen et al., *J. Chrom. Sci.* 12:458-364 and 464-472 (Aug. 1974).

C. G. Horvath et al., "Fast Liquid Chromatography: An Investigation of Operating Parameters and the Separation of Nucleotides on Pellicular Ion Exchanges" *Anal. Chem.* 39:1422-1428 (1967).

(List continued on next page.)

*Primary Examiner*—Joseph L. Schofer
*Assistant Examiner*—Fred Zitomer

[57] ABSTRACT

A process is provided for preparing ion-exchange resin particles of relatively uniform size by partial functionalization of non-uniform copolymer beads with ion-exchange groups. The non-uniform copolymer beads are preferably functionalized in a manner such that the ion-exchange groups are substituted at available sites which are most accessible to diffusion by functionalizing agents. Due to the size difference between individual copolymer particles, a greater proportion of available sites is functionalized in a small particle when compared to that of a large particle. Due to the greater proportion of ion-exchange groups present in a small particle, the small particle swells relatively more than a larger particle. The result is effectively a narrowing of the size distribution for the partially functionalized resin particles. The relatively uniform resin particles obtained by the process have performance advantages, such as reduced pressure drops, improved exchange kinetics, rinse efficiencies, and separation efficiencies when compared to fully functionalize ion-exchange resins that are non-uniform in particle size.

18 Claims, 3 Drawing Sheets

OTHER PUBLICATIONS

L. P. McMaster et al., "Preparation and Characterization of a Modified Ion-Exchange Resin" Ind. Eng. Chem. Prod. Res. Develop., 11:97-105 (1972).
G. Schmuckler et al., "Ion Exchange and Solvent Extraction" vol. 7, Chapter 1, pp. 1-27.
R. M. Wheaton et al., "Ion Exchange" vol. 11 Kirk-Othmer Ency. Chem. Tech. pp. 871-899 (2nd Ed. 1966).
T. Allen, *Particle Size Measurement,* 3rd Ed. (Chapman & Hall 1981), pp. 122-159.
F. Helfferich, *Ion Exchange* (McGraw-Hill 1962) pp. 35-36.
Calvin E. Schildknecht et al., *Polymer Processes,* Interscience Publishers, Inc. NY, Chapter III.

O.D. = Outer diameter
I.D. = Inner diameter

METHOD OF PREPARING UNIFORM SIZE ION EXCHANGE RESIN PARTICLES BY PARTIAL FUNCTIONALIZATION

BACKGROUND OF THE INVENTION

The present invention generally concerns ion-exchange resins and, in particular, a process for preparing improved ion-exchange resins by partially functionalizing non-uniform size copolymer beads with ion-exchange functional groups.

Ion-exchange resins are used widely for purification of various substances. Such resins are used in water treatment and purification, food preparation, pharmaceutical manufacturing, chemical processing, metal extraction, and so on, as is generally discussed by Wheaton et al, in, "Ion Exchange", 11 *Kirk-Othmer's Ency. Chem. Tech.* pp. 871–899 (2nd Ed. 1966).

In general, ion-exchange resins comprise a plurality of polymeric matrices typically in the form of spheroidal beads, or pearls, which are generally formed by suspension polymerization methods well-known to the art. The polymeric matrix has a plurality of attached functional groups which are capable of retaining ions, or molecules, of a chemical species when in contact with a liquid containing such species.

The nature of a suspension polymerization process is such that the resulting copolymer beads exhibit differing particle sizes, i.e., the beads collectively fit into a distribution of particle sizes. This distribution is retained, and in most instances widened, when the copolymer beads are substantially functionalized with ion-exchange groups. Many ion-exchange resins in commercial use today have broad particle size distributions.

However, of particular interest to industry are ion-exchange resins of relatively uniform particle size. These resins are desired due to their generally superior operating performance in commercial ion-exchange processes. For example, small resin particles have shorter diffusion paths into the particle for the species to be retained, which results in improved exchange kinetics when compared to larger resin particles. However, small resin particles generally tend to increase the pressure drop across a resin bed, which limits the amount of liquids that can be processed. Resin beads of fairly uniform size allow for use of generally smaller particles with their desirable exchange kinetics, since there are reduced, or minimal, amounts of very fine resin particles that would otherwise contribute toward unacceptably high pressure drops. Uniform size ion-exchange resins also generally have superior exchange kinetics in comparison to non-uniform resins. The superior exchange kinetics are due to a relatively short uniform diffusion path length for the chemical species being retained therein. The term "uniform diffusion path length" generally refers to the bead radius being essentially the same for each resin particle.

Chromatographic separations of various substances can be accomplished using ion-exchange resins as the stationary phase. Such processes use anion- or cation-exchange resins to separate, for example, mixtures of organic compounds. Of particular commercial importance is the separation of fructose from glucose and oligosaccharides in the production of high fructose-containing syrups. In this process, liquid mixtures of glucose and fructose are passed through one or more columns of a strong acid cation-exchange resin, most typically in the calcium form. The passage of the fructose through the column is retarded relative to that of the glucose, so there can be obtained separate product streams containing high proportions of fructose and glucose, respectively.

Uniform size resin particles are also advantageous for chromatographic separations to obtain sharp separations and maintain uniform flow through a chromatography column. These advantages are discussed in detail in U.S. Pat. Nos. 3,928,193 and 4,543,261, the relevant disclosures of which are incorporated herein by reference.

Industry has developed methods to produce ion-exchange resins of substantially uniform size. Such methods are directed toward preparing relatively uniform size monomer droplets which are thereafter polymerized to obtain copolymer beads having a narrow particle size distribution. Upon functionalization, the resulting ion-exchange resin exhibits a similar, narrow particle size distribution. Examples of such methods are found in U.S. Pat. Nos. 4,444,961; 4,427,794; and 4,487,898. These methods are generally quite complex and require large amounts of capital to provide the necessary process equipment.

Therefore, what is needed is a relatively simple process capable of converting non-uniform size copolymer beads into ion-exchange resins having a relatively narrow particle size distribution. Such a process could produce resins with the improved performance advantages, as previously discussed, without requiring complex and expensive equipment employed by prior methods.

SUMMARY OF THE INVENTION

The above objects and advantages are obtained by a process for preparing improved ion-exchange resins derived from a plurality of cross-linked copolymer beads which are non-uniform in particle size. The process comprises contacting the copolymer beads with a functionalizing agent under conditions sufficient to substitute ion-exchange groups onto the copolymer beads. Contact is continued until a partially functionalized ion-exchange resin is obtained having a particle size distribution characterized by a reduced standard deviation in comparison to the standard deviation for the particle size distribution obtained by substantially completely functionalizing the copolymer beads with the ion-exchange groups.

DETAILED DESCRIPTION OF THE INVENTION

The present invention is a process for converting essentially unfunctionalized, non-uniform size copolymer beads to partially functionalized ion-exchange resins which are relatively uniform in size when compared to resin obtained by substantially completely functionalizing the copolymer beads. The term "non-uniform" as used herein means that the copolymer beads or resin particles have diameters which vary and, thus, fit into a distribution of sizes, as illustrated for example by FIGS. 3 and 5 herein. Particle size distributions are described in detail by T. Allen in *Particle Size Measurement*, 3rd Ed., (Chapman & Hall 1981) at pp. 122-159, the relevant teachings of which are incorporated herein by reference. For ion-exchange resins, such particle size distributions are rarely symmetrical in nature, and more typically, are skewed toward larger or smaller particle sizes, as shown, for example, by Allen in FIG. 4-9 at page 132 of the article. Nevertheless, such distributions may be characterized as broad or narrow by reference to the standard deviation associated with a given particle size distribution.

As used herein, the term "available site" means a site on a copolymer bead which is capable of reacting with functionalizing agents to form an ion-exchange group. The term "narrowed particle size distribution" refers to conversion of non-uniform size copolymer beads into partially functionalized ion-exchange resins having a particle size distribution characterized by a reduced standard deviation in comparison to the standard deviation associated with the size distribution obtained by substantially completely functionalizing the copolymer beads.

Resins having a narrowed particle size distribution are obtained by partially functionalizing non-uniform size copolymer beads. Partial functionalization is preferably achieved by contacting the copolymer beads with functionalizing agents under conditions such that the particular functionalization reaction proceeds at a rate which is more rapid in comparison to the rate of diffusion for the functionalizing agents into the copolymer beads. In other words, the diffusion rate for such agents is the limiting rate for the reaction. As the agents diffuse into the bead, they react more readily with available sites located near the outer surface of the bead prior to diffusing farther therein.

It is known that sulfonation of a microporous, or gel-type, copolymer bead proceeds by a shell progressive mechanism wherein sulfonic acid groups are substituted substantially within a continuous shell that is disposed about a central, unfunctionalized copolymer core. This shell progressive mechanism is discussed by G. Schmuckler et al. in "Ion Exchange and Solvent Extraction", Vol. 7, Chapter 1, pp. 1-27 (Marcel Dekker, Inc. 1974), the teachings of which are incorporated herein by reference. As sulfonation proceeds, the shell thickness increases until the copolymer bead is fully sulfonated.

Figure 2:
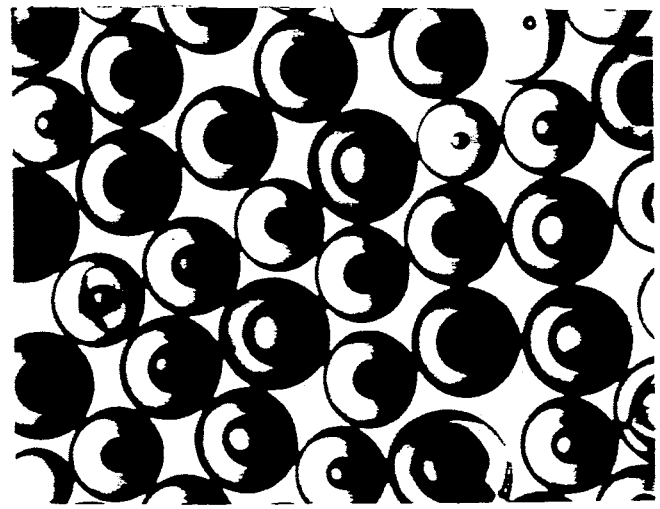
FIG. 2 is a photomicrograph of partially sulfonated resin beads prepared by Example 1.

Without wishing to be bound, it is believed that partially functionalized resins have a narrowed particle size distribution due to the varying degree with which non-uniform copolymer particles are functionalized with the ion-exchange groups. Although the thickness of the functionalized shell is roughly the same at a given point during the functionalization reaction regardless of the diameter for any given bead, a greater proportion of available sites in a small bead will be functionalized when compared to larger beads. This concept may be illustrated by reference to FIG. 2. The light portion of a particle represents a sulfonated outer shell, while the dark, central core is unfunctionalized copolymer. As can be seen in FIG. 2, a greater proportion of a small copolymer bead is sulfonated when compared to a larger bead. Substitution of ion-exchange groups, such as sulfonic acid groups, onto the copolymer beads causes them to swell due to an increase in molecular weight and imbibing of solvents, such as water. Thus, the small beads swell considerably more than the larger beads which are functionalized to a lesser extent. This partial functionalization and corresponding swelling differential results in a narrowed particle size distribution for the resulting resin.

To obtain a narrowed particle size distribution, it is important that the functionalization reaction be allowed to proceed to a point short of reaching substantially complete functionalization. However, it should be understood that an optimum degree of functionalization will depend upon numerous factors such as the particular application for the resulting resin, the types of monomers employed, the amount of cross-linking monomer employed, and initial size distribution for the copolymer beads. As such, the optimum degree of functionalization must be determined more or less empirically.

Figure 4:
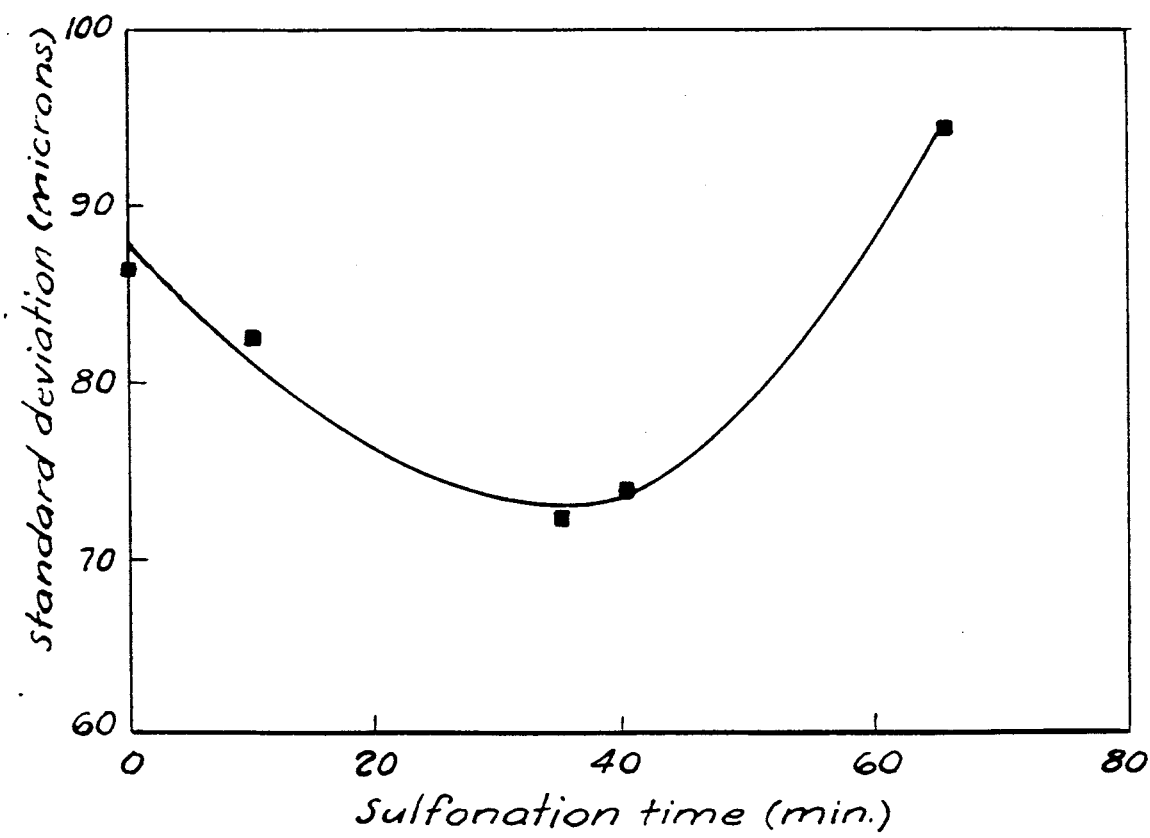
FIG. 4 is a graph which plots, over time, the change in standard deviation for samples of partially sulfonated ion-exchange resin particles prepared by Example 1.

As functionalization proceeds, the size distribution for the partially functionalized resin particles narrows, i.e., the standard deviation for the distribution of the partially functionalized beads is, in most instances, initially less than the standard deviation associated with the distribution for the unreacted copolymer beads. Over time, the standard deviation for the partially functionalized resin particles ultimately reaches a minimum value and then begins to increase, as shown by FIG. 4 and discussed in Example 1 hereinafter. The benefits of this invention are obtained by conducting the functionalization reaction to a point such that the partially functionalized resin obtained thereby has a particle size distribution characterized by a standard deviation which is less than the standard deviation associated with the distribution obtained by substantially completely functionalizing the copolymer beads.

The standard deviation for the size distribution of a given sample of copolymer beads or resin particles may be determined using any commercially available instrument designed to measure the particle size distribution of a discrete particulate sample. An example of such an instrument is a HIAC Criterion Model PC-320 Particle Size Analyzer available from The Pacific Scientific Company. A convenient method for conducting this measurement using this analyzer is described in Example 1.

The method used to prepare the copolymer beads is not critical to realize the benefits of this invention. As such, the copolymer beads may be prepared by any process known in the art. Such methods include, for example, a single-stage suspension polymerization process as described by F. Helfferich, *Ion-Exchange*, (McGraw-Hill 1962) at pages 35-36, wherein a water-immiscible monomer phase is suspension polymerized in a continuous aqueous phase to produce spheroidal copolymer beads.

Also suitable for preparing the copolymer bead matrix is a multi-staged, or seeded, suspension polymerization process. A multi-stage polymerization adds monomers in two or more increments. Each increment is followed by substantial polymerization of the monomers therein before adding a subsequent increment. Seeded polymerizations, as well as continuous or semi-continuous staged polymerizations, are described in U.S. Pat Nos. 4,419,245 and 4,564,644, the teachings of which are incorporated herein by reference.

Monomers suitable for preparing copolymer beads are addition polymerizable ethylenically unsaturated compounds. Typically a major portion of at least one monovinylidene compound is polymerized with a minor portion of an addition polymerizable polyvinylidene compound which acts as a cross-linking monomer. Such monomers are known in the art and reference is made for purposes of illustration to *Polymer Processes*, edited by Calvin E. Schildknecht, published in 1956 by Interscience Publishers, Inc., New York, Chapter III, the relevant teachings of which are incorporated by reference.

In Table II on pp. 78-81 of the Schildknecht article, a diverse number of monomers are listed which can be employed in practicing this invention. Of such monomers, of particular interest herein are water-insoluble monomers like the monovinylidene aromatics such as styrene, vinyl naphthalene, alkylene-substituted styrenes (particularly monoalkyl-substituted styrenes such as vinyltoluene and ethylvinylbenzene) and halo-substituted styrenes such as bromo- or chlorostyrene and vinylbenzylchloride; polyvinylidene aromatics such as divinylbenzene, divinyltoluene, divinylxylene, divinylnaphthalene, trivinylbenzene, divinyldiphenyl ether and the like; and $\alpha,\beta$-ethylenically unsaturated carboxylic acids and esters thereof, such as methyl methacrylate, ethylacrylate, diverse alkylene diacrylates and alkylene dimethacrylates; and mixtures of one or more of said monomers. Of these compounds, preferred monomers are the monovinylidene aromatics, particularly styrene, vinylbenzylchloride, or vinyltoluene: the polyvinylidene aromatics, particularly divinylbenzene; and esters of $\alpha,\beta$-ethylenically unsaturated carboxylic acids, particularly acrylic acid, methyl methacrylate, or mixtures thereof. Acrylonitrile is also a preferred monomer.

The copolymer beads are prepared from monomer mixtures which include at least one monovinylidene monomer in an amount of from about 88 to about 99.5 weight percent, preferably from about 90 to about 98.5 weight percent, and more preferably from about 92 to about 98 weight percent based on the weight of monomers in the mixture, with the balance of the monomers being a cross-linking monomer. Such monomer mixtures typically include free-radical polymerization initiators which are well-known in the art, such as azo compounds like azobisisobutyronitrile: peroxy compounds like benzoyl peroxide, t-butyl peroctoate, t-butyl perbenzoate and isopropyl percarbonate.

A diluent which is substantially inert under polymerization conditions may also be incorporated into the monomer phase to obtain macroporous copolymer beads. The term "macroporous" (also referred to as macroreticular) is well-known in the art and, in general, refers to resins prepared from copolymer beads which have regions of densely packed polymer chains exhibiting molecular-sized porosity which are separated by copolymer-free voids, often referred to as mesopores (50-200 Å) and macropores (>200 Å). In contrast, microporous, or gel-type, resins have pores generally of molecular-size (generally less than about 50 Å) and are prepared from monomer mixtures which do not employ an inert diluent. Macroporous and gel resins are further described in U.S. Pat. Nos. 4,224,415 and 4,382,124, the teachings of which are incorporated herein by reference.

Suitable inert diluents are those which are a solvent for the monomer mixture, but not the resulting copolymer. Accordingly, use of an inert diluent results in phase separation of the copolymer from the monomer phase during polymerization. Inert diluents are generally organic compounds having boiling points greater than about 60° C. and include, for example, aromatic hydrocarbons, aliphatio hydrocarbons, alcohols, and halogenated hydrocarbons. Preparation of macroporous copolymer beads is well-known in the art. The benefits of the present invention are obtained with either macroporous or gel copolymer beads.

For both macroporous and gel copolymer beads, partial functionalization preferably results in ion-exchange groups being substituted within a continuous shell that is disposed about a central, essentially unfunctionalized, copolymer core as previously described. However, due to increased porosity, macroporous copolymer beads that are partially functionalized may not yield, in all instances, a sharp core/shell distribution of the ion-exchange groups. Also, under certain reaction conditions it is possible to reduce reaction rates such that functionalizing agents diffuse more readily into the bead prior to reaction. Nevertheless, the benefits of the invention are obtained by partially functionalized resins which are not substituted according to a strict core/shell distribution, due to a similar differential swelling effect.

The type and amount of monomers used in preparing the copolymer beads impacts the degree to which the beads swell upon being partially functionalized. The swelling of a particular copolymer, upon being functionalized, may be characterized by its swellability ratio, also referred to herein as $\beta$. The swellability ratio is a measure of the volume change which occurs upon functionalization of the copolymer. This parameter is defined by the formula:

$$\beta = \frac{V_r}{V_p}$$

wherein:
$V_r$ is the volume of a copolymer bead which is substantially completely functionalized with ion-exchange groups and swollen with a solvent, typically water; and
$V_p$ is the volume of the unreacted copolymer bead.

In general, copolymers having a large $\beta$ exhibit a greater change in volume upon partial functionalization when compared to copolymer beads having a smaller $\beta$. Copolymer beads employed herein advantageously have a $\beta$ of from about 1.5 to about 10, preferably from about 2 to about 8, more preferably from about 2.5 to about 6, and most preferably from about 3 to about 5. Below about 1.5, the swelling differential is relatively small and narrowing of the size distribution for the resulting partially functionalized resin is not as significant. A $\beta$ greater than about 10 generally results in resins of diminished physical strength. As used herein, $\beta$ is determined by use of water as the swelling solvent.

The copolymer beads employed preferably have a volume average particle diameter of from about 100 to about 1600 micrometers ($\mu$m), more preferably from about 200 to about 1200 $\mu$m, and most preferably from about 250 to about 700 μm. Volume average particle diameter may be determined by the HIAC Criterion Model PC-320 Particle Size Analyzer previously mentioned.

The copolymer beads may have a size distribution that is relatively broad or narrow and still receive the benefits of the invention. However, copolymer beads having a broad size distribution tend to have more significant improvement with respect to a narrowed particle size distribution.

The copolymer beads may be converted to cation-exchange resin by any process which yields partial functionalization of the copolymer beads with cation-exchange groups. For example, sulfonated cation-exchange resins may be prepared from the copolymer beads by following the methods described, for example, in U.S. Pat. Nos. 3,266,007; 2,500,149; 2,631,127; 2,664,801; and 2,764,564, except that the beads are only partially functionalized as described herein. The relevant disclosures of these patents are incorporated herein by reference.

In general, sulfonated cation-exchange resins are prepared by contacting the copolymer beads with a sulfonating agent at an elevated temperature and for a time sufficient to achieve a desired degree of sulfonation. Suitable sulfonating agents include concentrated sulfuric acid, i.e., acid having a sulfuric acid concentration greater than about 90 percent based on total weight: oleum: chlorosulfonic acid: or sulfur trioxide. A preferred sulfonation agent is sulfuric acid. The amount of concentrated sulfuric acid employed is advantageously that which is sufficient to provide adequate mixing during reaction, with a weight ratio of acid to beads of from about 4.5:1 to about 16:1 being generally sufficient. Suitable temperatures for sulfonation with sulfuric acid are from about 20° to about 150° C.

The temperature at which the sulfonating agent and copolymer beads are maintained is not particularly critical, but low temperatures generally slow the rate of sulfonation and allow for better control over narrowing of the size distribution for the partially sulfonated resin particles. As such, it is desirable to maintain a temperature of from about 30° to about 140° C., preferably from about 40° to about 120° C., and most preferably from about 50° to about 90° C.

Sulfonation of the copolymer beads with sulfuric acid is preferably conducted in the presence of a swelling agent. Suitable swelling agents include methylene chloride, ethylene dichloride, and sulfur dioxide. The amount of swelling agent is preferably sufficient to give a weight ratio of swelling agent to copolymer beads of from about 0.3 to about 1. Typically, the copolymer beads are contacted with the swelling agent prior to sulfonation for a time sufficient to substantially swell the beads, generally at least about 10 minutes. Use of a swelling agent usually produces a smoother interface between sulfonated and unsulfonated portions of the copolymer bead, when compared to copolymer beads that are sulfonated without such swelling agents.

After sulfonation, the resin is hydrolyzed to minimize potential breakage of the copolymer beads and, if desired, converted to a metal salt. Preferably, gel resins are hydrolyzed by washing the sulfonated copolymer beads with a series of aqueous sulfuric acid solutions, each of which is successively more dilute in comparison to the sulfuric acid solution used in the preceding acid wash, and finally with water. Other methods to hydrolyze sulfonated copolymer beads are known in the art.

Thereafter, the washed resin may be converted to a desired metal salt form by contact with a saturated aqueous solution of a water-soluble metal salt or base having the desired metal counterion. For example, the resin can be converted to its calcium form by contact with a calcium chloride or calcium hydroxide solution. The resin may be converted to other metal salt forms in like manner.

In the case of gel resins, the degree of sulfonation can be determined by withdrawing a sample of the beads, quenching the reaction by addition of a less concentrated, i.e., less than 90 weight percent, sulfuric acid solution, washing the beads with water, and examining the partially functionalized beads under a microscope. The beads will have an appearance like those of FIG. 2 herein, wherein the light shell is sulfonated copolymer, while the dark core is essentially unfunctionalized copolymer. For macroporous resins which are opaque, the degree of sulfonation is not readily observable under a microscope. However, it is possible to determine the degree of functionalization for macroporous resins inferentially by comparison of their measured capacity, such as dry weight capacity. The distribution of the ion-exchange groups in a partially functionalized macroporous resin can also be determined by x-ray mapping of bead cross-sections according to techniques known in the art. For either macroporous or gel resins, the extent of sulfonation can also be controlled by employing sub-stoichiometric amounts of the sulfonating agent.

Copolymer beads may be converted to anion-exchange or chelate-exchange resins by any method which yields partial functionalization of the copolymer beads with such groups. For example, strong-base or weak-base anion-exchange resins may be prepared from beads of a haloalkylated copolymer or cross-linked poly(vinylbenzylchloride) by following the methods described, for example, in U.S. Pat. Nos. 2,642,417; 2,960,480; 2,597,492; 2,597,493; 3,311,602; 2,632,000; 2,632,001 and 2,992,544, except that the beads are only partially functionalized as previously described. Similarly, chelate-exchange groups may be attached to the copolymer beads by reacting them with compounds like aminopyridines, as disclosed by U.S. Pat. Nos. 4,031,038 and 4,098,867. The relevant teachings of the above-identified patents are incorporated herein by reference.

In general, the copolymer beads are preferably chloromethylated by first swelling them with a chloromethylating agent, such as chloromethylmethylether, and an effective amount of a Friedel-Crafts catalyst. The swollen copolymer beads are then heated to a temperature sufficient to react the chloromethylmethylether with the copolymer beads and the temperature is maintained until achieving a desired degree of reaction. Weak or strong base anion-exchange groups may be substituted on the chloromethylated copolymer beads by contact under reactive conditions with an aminating agent, such as a secondary or tertiary amine. Examples of suitable amination agents are dimethylamine, diethylamine, dipropylamine, trimethylamine, dimethylethanolamine, and 2-picolylamines. The conditions employed for such amination reactions are known in the art.

The temperature at which the chloromethylated copolymer beads are contacted with the aminating agent is advantageously lower than temperatures commonly employed, for reasons similar to those previously discussed in connection with sulfonated resins. The contact temperature is preferably from about 0° to about 90° C., and most preferably from about 40° to about 60° C.

Although diffusion of aminating agents into the copolymer beads is more rapid in comparison to the sulfonating agents previously discussed, amination reactions generally have very high reaction rates. Thus, the rate of diffusion into the bead is still generally the rate limiting step, and anion- or chelate-exchange groups will be substituted onto the copolymer beads at available sites most accessible to diffusion by the aminating agent. Due to the quantitative nature of amination reactions, partial amination may also be achieved by reacting the haloalkylated copolymer beads with sub-stoichiometric amounts of the aminating agent. Reaction with sub-stoichiometric amounts of the aminating agent allows for good control over partial amination.

Another method to conduct partial amination is to employ copolymer beads wherein, during chloromethylation, chloromethyl groups are substituted onto the copolymer at available sites which are most accessible to the chloromethylating agent. Thus, upon amination the anion- or chelate-exchange groups are formed at these sites.

Other methods which partially aminate the copolymer beads and result in a narrowed particle size distribution will become apparent to those skilled in the art upon reading the disclosure herein.

Other functionalizing reactions which substitute ion-exchange groups onto a copolymer bead matrix are contemplated by the present invention. The partially functionalized resins produced exhibit narrowed particle size distributions with the corresponding performance advantages previously described. The resins also exhibit a narrowed diffusion path length for retention of chemical species, as shown by Example 6 hereinafter.

Partial functionalization results in resins having reduced capacities when compared to an otherwise similar resin that is substantially completely functionalized with ion-exchange groups. The term "substantially completely functionalized" refers to resin wherein the copolymer beads are each substantially functionalized throughout the length of their radius, i.e., there is essentially no unfunctionalized copolymer core. The term "capacity" refers to ion-exchange, adsorption, or chelate-exchange capacity, depending upon the particular application for the resulting resin. Partial functionalization advantageously results in resins having from about 10 to about 90 percent, preferably from about 20 to about 80 percent, and more preferably from about 30 to about 70 percent of the capacity for an otherwise similar resin that is substantially completely functionalized with ion-exchange groups.

The partially functionalized resins obtained preferably have a volume average particle diameter of from about 125 to about 2000, more preferably from about 200 to about 1500, and most preferably from about 250 to about 850 μm. In addition, the resin has a narrowed particle size distribution as previously described herein.

SPECIFIC EMBODIMENTS OF THE INVENTION

The following examples are intended to illustrate the invention and should not be construed to limit the scope of the appended claims. All parts and percentages are by weight and all temperatures are in degrees Celsius (°C.), unless stated otherwise.

EXAMPLE 1

This example employs gel styrene-divinylbenzene copolymer beads which have a non-uniform particle size distribution. The beads are prepared by polymerizing styrene and a commercially available mixture of divinylbenzene in a single-stage suspension polymerization to yield gel copolymer beads having 5.7 percent divinylbenzene, based on total weight of the monomers employed. The commercially available divinylbenzene mixture is obtained from The Dow Chemical Company and consists of 55 percent divinylbenzene, with the balance of the mixture being essentially ethylvinylbenzene.

The copolymer beads are analyzed on the HIAC Particle Size Analyzer, previously described, to determine volume median particle diameter, volume average particle diameter, and standard deviation. The analyzer is set such that the particles fit into 12 channels. Table I, which follows, identifies the size of particles which fit into each respective channel, as well as the volume percent of the copolymer beads which are retained therein:

TABLE I

Size Distribution of Copolymer Beads Employed in Example 1

| Channel No. | Size Range (μm) | Volume % |
|---|---|---|
| 1 | 297–354 | 7.4 |
| 2 | 354–420 | 16.4 |
| 3 | 420–500 | 32.2 |
| 4 | 500–595 | 37.2 |
| 5 | 595–707 | 6.2 |
| 6 | 707–841 | 0.5 |
| 7 | 841–1000 | — |
| 8 | 1000–1190 | — |
| 9 | 1190–1410 | — |
| 10 | 1410–1680 | — |
| 11 | 1680–2000 | — |
| 12 | 2000–2500 | — |

Figure 1:
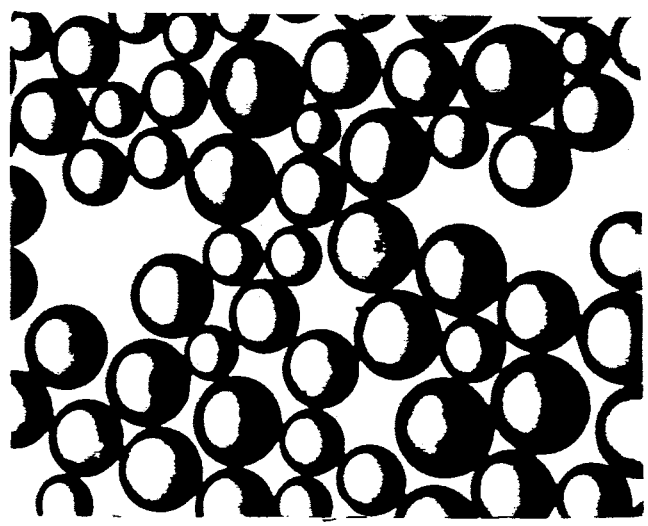
FIG. 1 is a photomicrograph of very lightly sulfonated copolymer beads which is discussed in Example 1.

The copolymer beads, in an unswollen state, have a volume average particle diameter of 453 μm and their particle size distribution is characterized by a standard deviation of 86.3 μm. FIG. 1 is a photomicrograph of the copolymer beads after being sulfonated for 4 minutes. Although the beads are lightly sulfonated, i.e., a sulfonated shell is not visible within the beads, FIG. 1 illustrates that the copolymer beads have diameters which differ to a significant extent.

The analyzer is equipped with a Hewlett-Packard HP-85B microcomputer which takes data from the analyzer and calculates cumulative volume percent and standard deviation according to the following algorithm. The algorithm first calculates the arithmetic mean diameter ($D_i$) for each channel by the following equation:

$$D_i = \frac{(X_{li} + X_{ui})}{2}$$

where $X_{li}$ represents the smallest particle diameter retained by a channel and $X_{ui}$ represents the largest particle diameter retained by a channel. The number frequency ($dN_i$) for each channel is then determined by the formula:

$$dN_i = N_i - N_{i+1}$$

where $N_i$ is the number of particles which are retained by a channel and $N_{i+1}$ is the number of particles retained by the next largest channel. The volume percent retained by each channel, $V_i$, is then calculated by the formula:

$$V_i = 100 \left[ \frac{D_i^3 \, dN_i}{\sum_{i=1}^{12} D_i^3 \, dN_i} \right]$$

The cumulative volume percent of the sample which is retained by each channel ($CV_i$) is calculated by the following formula:

$$CV_i = \sum_{i=1}^{i} V_i$$

After determining cumulative volume percentages, the standard deviation for the sample is calculated by the following formula:

$$\sigma = \frac{(D_{v0.84} - D_{v0.16})}{2}$$

where $D_{v0.84}$ and $D_{v0.16}$ represent, respectively, the largest particle diameter contained within 84 percent and 16 percent of the sample, in terms of cumulative volume percent. In other words, particles contained within 84 cumulative volume percent of the sample have diameters less than $D_{v0.84}$ and so on. $D_{v0.84}$ and $D_{v0.16}$ are each determined by interpolation from the cumulative volume percent data calculated for a sample. For purposes of illustration, Table II shows the computational results of the algorithm for copolymer beads employed in Example 1. For the copolymer beads, $D_{v0.84}$ is determined to be 565.6 μm, $D_{v0.16}$ is 393.1 μm, and $$\sum_{i=1}^{12} D_i^3 dN_i = 92972060743.$$

The copolymer beads are sulfonated according to techniques generally known in the art. A 100 gram portion of the copolymer beads is placed at room temperature into a stirred flask containing 1000 grams of a 99 percent solution of sulfuric acid. A 100 gram portion of methylene chloride, a swelling agent, is then added. The copolymer beads are allowed to swell for 30 minutes. Thereafter, the flask is heated at a substantially constant rate over a period of approximately 25 minutes to a temperature of 60° C. The flask contents are then maintained at this temperature. Approximately 10 milliliter (ml) samples of partially sulfonated copolymer beads are withdrawn at intervals of 10, 35, 40 and 65 minutes, respectively, subsequent to reaching a flask temperature of 60° C. Immediately after withdrawal, approximately 20 ml of a 90 percent aqueous sulfuric acid solution is added to each sample to quench the reaction. FIG. 2 is a photomicrograph of partially sulfonated resin beads sampled at a time of 65 minutes.

Thereafter, the samples are each separately hydrated by successive rinses with dilute sulfuric acid solutions, each of the acid rinses being less dilute in comparison with the immediately preceding acid rinse. Hydration is conducted by first loading approximately 30 ml of a sample into a fritted glass charging column. The sample is rinsed with an excess amount, i.e., about 60 ml of a 43 percent aqueous sulfuric acid solution which is added dropwise into the charging column at a rate of about 10 ml/min. This is followed by rinsing with 60 ml of a 19 percent aqueous sulfuric acid solution and 60 ml of a five percent aqueous sulfuric acid solution in the same manner. The resins are finally rinsed with deionized water to a neutral pH.

The partially sulfonated resin samples are each analyzed with the particle size analyzer to determine their respective particle size distributions. The volume median particle diameter, volume average particle diameter, and standard deviation for the resulting particle size distribution of each sample and the copolymer beads are given in Table III.

TABLE III

| | Particle Size Analysis For Sulfonation at 60° C. | | |
|---|---|---|---|
| Sulfonation Time (min.) | Vol. Median Particle Diameter (μm) | Vol. Avg. Particle Diameter (μm) | Standard Deviation (μm) |
| 0 | 486 | 453 | 86.3 |
| 10 | 597 | 566 | 82.8 |
| 35 | 644 | 631 | 72.3 |
| 40 | 644 | 623 | 73.7 |
| 65 | 702 | 666 | 94.8 |

TABLE II

| | | HIAC Data for Copolymer Beads Employed in Example 1 | | | | | |
|---|---|---|---|---|---|---|---|
| | Particle Size Range for Channel | | No. Particles Retained in | Mean Particle Size within | Number Frequency in | | Volume Percent Retained by | |
| Channel No. (i) | $X_{li}$ (μm) | $X_{ui}$ (μm) | Channel $N_i$ | Channel $D_i$ (μm) | Channel $dN_i$ | $D_i^3 dN_i$ (μm³) | Channel $V_i$ (%) | $CV_i$ (%) |
| 1 | 297 | 354 | 1003 | 325.5 | 199 | 6862874469 | 7.4 | 7.4 |
| 2 | 354 | 420 | 804 | 387.0 | 263 | 15243638589 | 16.4 | 23.8 |
| 3 | 420 | 500 | 541 | 460.0 | 308 | 29979488000 | 32.2 | 56.0 |
| 4 | 500 | 595 | 233 | 547.5 | 211 | 34628591391 | 37.2 | 93.3 |
| 5 | 595 | 707 | 22 | 651.0 | 21 | 5793783471 | 6.2 | 99.5 |
| 6 | 707 | 841 | 1 | 774.0 | 1 | 463684824 | 0.5 | 100.0 |
| 7 | 841 | 1000 | — | 920.5 | — | — | — | — |
| 8 | 1000 | 1190 | — | 1095.0 | — | — | — | — |
| 9 | 1190 | 1410 | — | 1300.0 | — | — | — | — |
| 10 | 1410 | 1680 | — | 1545.0 | — | — | — | — |
| 11 | 1680 | 2000 | — | 1840.0 | — | — | — | — |
| 12 | 2000 | 2500 | — | 2250.0 | — | — | — | — |

Figure 3:
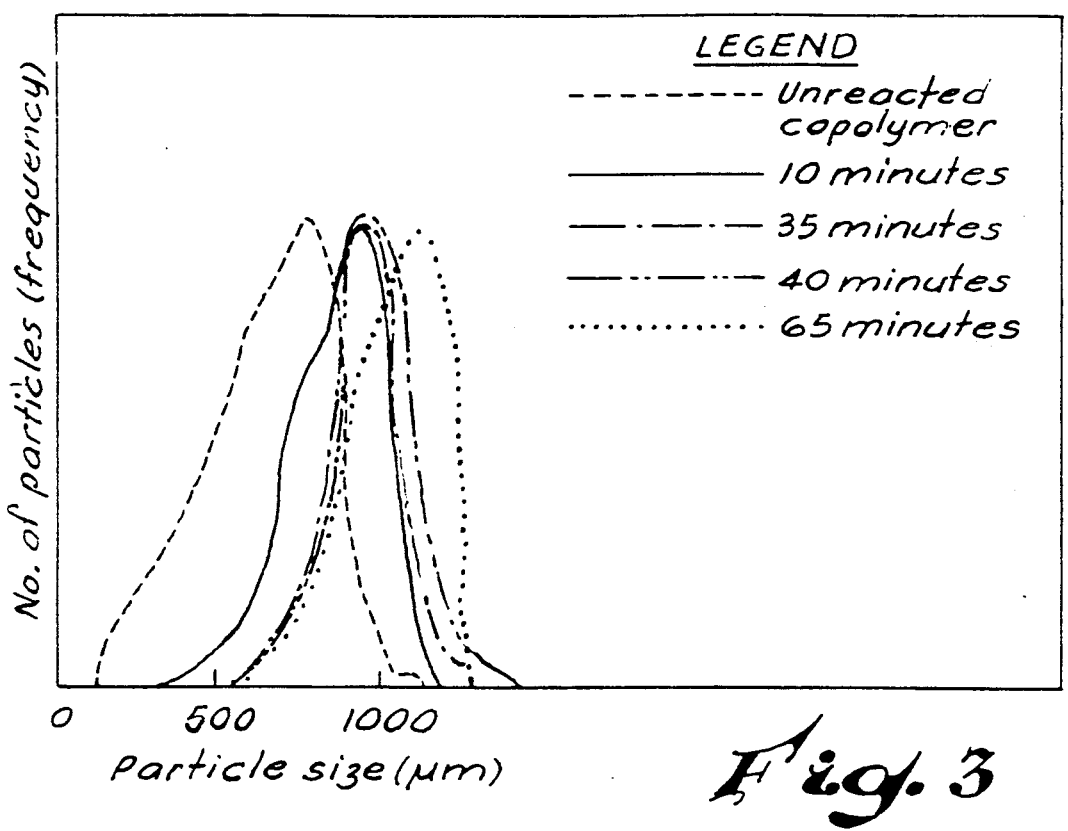
FIG. 3 is a graph showing the particle size distributions for unreacted copolymer beads, and samples of partially sulfonated ion-exchange resin particles prepared therefrom, which are discussed in Example 1.

The size distributions obtained are also illustrated by FIG. 3 which shows distribution curves produced by the analyzer. The data shows that partially sulfonated resins obtained from copolymer beads sulfonated for 35 and 40 minutes, respectively, have significantly narrowed particle size distributions in comparison to resin samples obtained from sulfonating the same copolymer beads for 10 minutes or 65 minutes, respectively. For comparison purposes, Table IV, which follows, confirms this result by identifying the volume percent of the partially sulfonated copolymer beads, sampled at 40 minutes, which are retained by each respective channel:

TABLE IV

Size Distribution of Partially Sulfonated Copolymer Beads After 40 Minutes

| Channel No. | Size Range (μm) | Volume % |
|---|---|---|
| 1 | 297–354 | 0.3 |
| 2 | 354–420 | 0.3 |
| 3 | 420–500 | 2.8 |
| 4 | 500–595 | 20.0 |
| 5 | 595–707 | 57.6 |
| 6 | 707–841 | 18.4 |
| 7 | 841–1000 | 0.6 |
| 8 | 1000–1190 | — |
| 9 | 1190–1410 | — |
| 10 | 1410–1680 | — |
| 11 | 1680–2000 | — |
| 12 | 2000–2500 | — |

The narrowed particle size distribution is also shown by FIG. 4 which is a graph of the standard deviation associated with a given sample versus the elapsed time for sulfonation. FIG. 4 shows that as sulfonation proceeds, the standard deviation for the partially sulfonated resin particles decreases until reaching a minimum after about 30 to 40 minutes. Thereafter, the standard deviation begins to increase until it exceeds the standard deviation for the unreacted copolymer beads and continues to increase.

EXAMPLE 2

Figure 5:
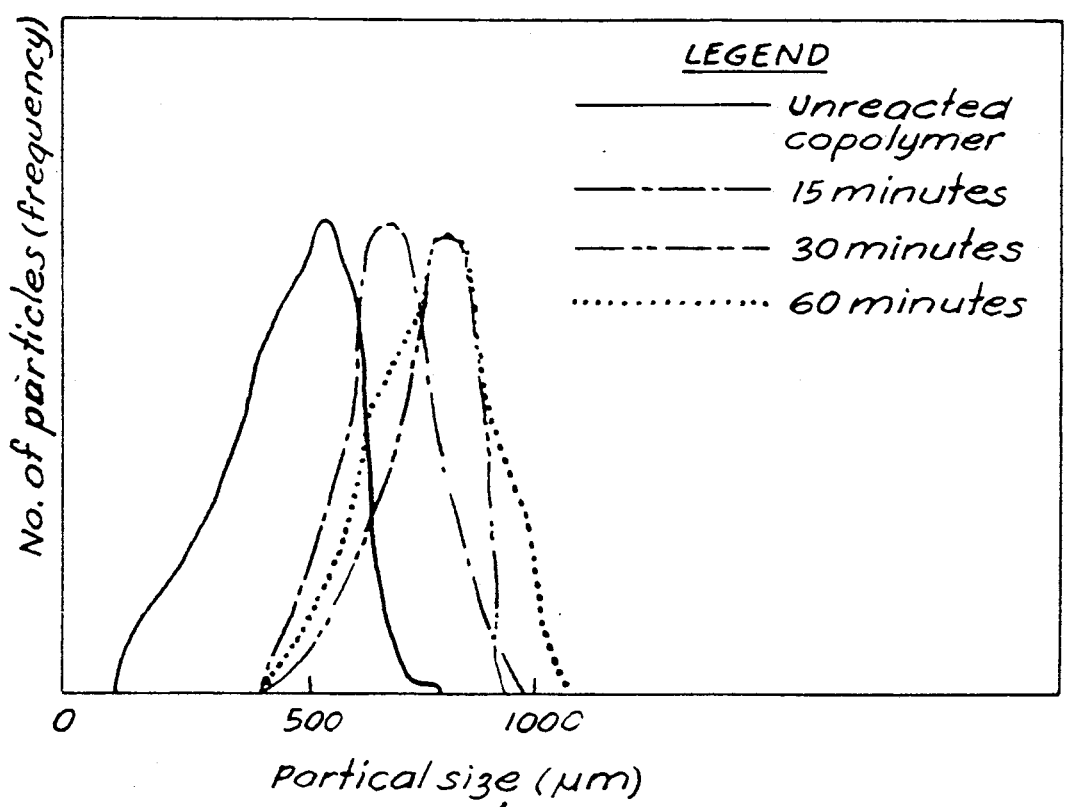
FIG. 5 is a graph showing the particle size distributions for unreacted copolymer beads, and samples of partially sulfonated resin particles prepared therefrom, which are discussed in Example 2.

The procedure of Example 1 is substantially repeated, except as otherwise indicated hereinafter. Sulfonation is conducted at a temperature of 80° C. Samples of partially sulfonated copolymer beads are withdrawn from the reaction flask at times of 15, 30, and 60 minutes, respectively, after reaching the sulfonation temperature of 80° C. After the samples are hydrated, the resulting resins are each analyzed for volume median particle diameter, volume average particle diameter, and standard deviation of the sample size distribution as in Example 1. The results are given in Table V and the analyzer particle size distribution curves are illustrated in FIG. 5.

TABLE V

Particle Size Analysis For Sulfonation at 80° C.

| Sulfonation Time (min.) | Volume Median Particle Diameter (μm) | Volume Average Particle Diameter (μm) | Standard Deviation (μm) |
|---|---|---|---|
| 0 | 486 | 453 | 86.3 |
| 15 | 650 | 631 | 90.7 |
| 30 | 727 | 676 | 96.8 |
| 60 | 734 | 689 | 130.0 |

This example confirms the result of Example 1 and indicates that higher sulfonation temperatures provide less control over narrowing of the particle size distribution due to a more rapid reaction rate, as seen by larger values for standard deviation when compared to those of Example 1.

EXAMPLE 3

The procedure of Example 1 is substantially repeated, except that the copolymer beads are macroporous.

The macroporous copolymer beads are prepared by polymerizing styrene, a commercially available divinylbenzene mixture, and iso-octane obtained from The Dow Chemical Company whose major component is 2,2,4-trimethylpentane as a liquid diluent, in a single-stage suspension polymerization to yield macroporous copolymer beads having 6 weight percent divinylbenzene, based on total weight of the monomers employed. The divinylbenzene mixture is obtained from The Dow Chemical Company and consists of 55 weight percent divinylbenzene, with the balance of the mixture being essentially ethylvinylbenzene. The diluent is employed in an amount sufficient to yield an organic phase having 42 weight percent diluent, based upon the weight of the monomers and diluent. The particle size analyzer has channel sizes which differ from those used in Example 1, as indicated by Table VI.

TABLE VI

Size Distribution of Macroporous Copolymer Beads Employed in Example 3

| Channel No. | Size Range (μm) | Volume % |
|---|---|---|
| 1 | 149–297 | 1.4 |
| 2 | 297–354 | 4.8 |
| 3 | 354–420 | 11.9 |
| 4 | 420–500 | 24.1 |
| 5 | 500–595 | 41.1 |
| 6 | 595–707 | 14.8 |
| 7 | 707–841 | 1.9 |
| 8 | 841–1000 | 0.0 |
| 9 | 1000–1190 | 0.0 |
| 10 | 1190–1410 | 0.0 |
| 11 | 1410–1680 | 0.0 |
| 12 | 1680–2500 | 0.0 |

The macroporous copolymer beads, in an unswollen state, have a volume average particle diameter of 460 μm and their particle size distribution is characterized by a standard deviation of 93.8 μm.

The macroporous copolymer beads are sulfonated by generally following the procedure of Example 1. A 75 gram portion of the copolymer beads is placed with 750 grams of the 99 percent sulfuric acid solution in the reaction flask and the flask contents are agitated for 30 minutes. Thereafter, the flask is heated at a substantially constant rate over a period of approximately 40 minutes to a temperature of 80° C. The flask contents are then maintained at this temperature. Samples of partially sulfonated copolymer beads are withdrawn at the time intervals indicated on Table VII, subsequent to reaching a flask temperature of 80° C. The samples are hydrated by immersion in an excess amount of the 43 weight percent sulfuric acid solution and finally washed with water to a neutral pH. All remaining procedures are substantially similar to those of Example 1. The volume median particle diameter, volume average particle diameter, and standard deviation of the size distribution for each sample are given in Table VII.

TABLE VII

Particle Size Analysis For Sulfonation of Macroporous Copolymer Beads

| Sulfonation Time (min.) | Volume Median Particle Size (μm) | Volume Average Particle Size (μm) | Standard Deviation |
|---|---|---|---|
| 0 | 625 | 490 | 102.7 |
| 20 | 760 | 654 | 137.9 |
| 30 | 812 | 699 | 134.5 |
| 40 | 862 | 763 | 126.6 |
| 50 | 894 | 774 | 123.5 |
| 60 | 924 | 798 | 126.5 |
| 80 | 928 | 793 | 139.8 |
| 100 | 950 | 846 | 158.3 |
| 120 | 935 | 645 | 177.0 |
| 150 | 942 | 840 | 166.1 |
| 200 | 949 | 845 | 157.6 |

For purposes of comparison with Table VI, the size distribution obtained for the sample taken at 50 minutes is given in Table VIII.

TABLE VIII

Size Distribution of Partially Sulfonated Macroporous Copolymer Beads Obtained After 50 Minutes

| Channel No. | Size Range (μm) | Volume % |
|---|---|---|
| 1 | 149–297 | 0.4 |
| 2 | 297–354 | 0.1 |
| 3 | 354–420 | 0.2 |
| 4 | 420–500 | 0.8 |
| 5 | 500–595 | 1.7 |
| 6 | 595–707 | 7.1 |
| 7 | 707–841 | 21.3 |
| 8 | 841–1000 | 51.9 |
| 9 | 1000–1190 | 16.4 |
| 10 | 1190–1410 | — |
| 11 | 1410–1680 | — |
| 12 | 1680–2500 | — |

The results of Example 3 confirm a similar narrowing of the particle size distribution over time for partially sulfonated macroporous copolymer beads.

EXAMPLE 4

Figure 6:
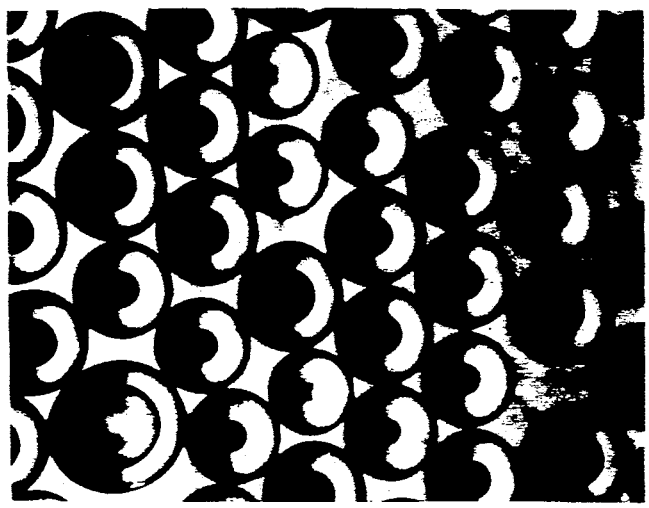
FIG. 6 is a photomicrograph of partially sulfonated resin beads prepared by Example 4.
Figure 6:
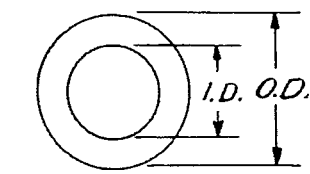

The procedure of Example 1 is substantially repeated, except as otherwise indicated hereinafter. Upon reaching the sulfonation temperature of 60° C., eleven samples of partially sulfonated copolymer beads are withdrawn from the reaction flask at successive 20 minute intervals. After hydration, photomiorographs are taken of the resin beads in each sample. FIG. 6 is a representative photomicrograph which depicts resin beads obtained from the sample taken at an elapsed time of 90 minutes. The portion of a bead which appears light in shade is the sulfonated shell, while the darker portion is the unfunctionalized copolymer core.

The photomicrographs are each separately analyzed to determine an average, normalized thickness for the shell at that particular point in the sulfonation, i.e., the diffusion path length. At least 30 resin beads in a sample are measured to determine, for each bead, the diameter of the unfunctionalized copolymer core (hereinafter "ID") and the diameter of the resulting partially sulfonated resin bead (hereinafter "OD"). Each measurement is illustrated in FIG. 6.

The normalized average diffusion path length for each resin sample is calculated according to the formula:

$$D_{avg}/OD_{avg}$$

wherein:

$D_{avg}$ is the average diffusion path length of the sample which is calculated by taking (OD - ID) for 30 resin beads in a sample and then determining the average of those differences: and $OD_{avg}$ is the average OD of the measured resin beads.

The normalized standard deviation of the diffusion path length is calculated by the following formula:

$$D_{sd}/OD_{avg}$$

wherein:

$D_{sd}$ is the standard deviation for the diffusion path length of 30 beads in a sample which is calculated by taking (OD - ID) for each resin bead and then calculating the standard deviation for the differences; and $OD_{avg}$ is the average OD of the measured resin beads. The results of this analysis are shown in Table IX.

TABLE IX

Data Illustrating Narrowing of Diffusion Path Length

| Sulfonation Time (Min.) | Normalized Avg. Diffusion Path Length (μm) | Normalized Standard Deviation for Diffusion Path Length (μm) |
|---|---|---|
| 70 | 0.499 | 0.100 |
| 90 | 0.594 | 0.077 |
| 110 | 0.766 | 0.085 |
| 130 | 0.781 | 0.115 |
| 150 | 0.883 | 0.154 |
| 170 | 0.930 | 0.120 |
| 190 | 0.958 | 0.152 |
| 210 | 0.985 | 0.176 |
| 230 | 0.994 | 0.172 |

The results indicate that partial sulfonation yields resins having a more uniform diffusion path length relative to resins which are substantially completely functionalized with ion-exchange functional groups, i.e., the sample obtained at a sulfonation time of 230 minutes. This narrowing of the diffusion path length is illustrated by the generally smaller standard deviation values with respect to samples obtained after 90 to 110 minutes of sulfonation relative to the larger standard deviation value obtained after 230 minutes of sulfonation. A relatively uniform diffusion path length from particle to particle is advantageous for exchange kinetics, as previously discussed herein.

I claim:

1. A process for preparing improved ion-exchange resins that are derived from a plurality of cross-linked copolymer beads which are non-uniform in particle size, the process comprising:

contacting the copolymer beads with a functionalizing agent under conditions sufficient to substitute ion-exchange groups onto the copolymer beads; and continuing the contact until a partially functionalized ion-exchange resin is obtained having a particle size distribution characterized by a standard deviation located substantially at the minimum point on a two-dimensional curve, the curve being defined by a plot of standard deviation versus contact time for the copolymer beads wherein standard deviation is plotted in reference to the vertical axis and contact time is plotted in reference to the horizontal axis.

2. The process of claim 1 wherein the ion-exchange groups are substituted at available sites which are most accessible to diffusion by the functionalizing agent.

3. The process of claim 1 wherein the ion-exchange groups are substituted substantially within a continuous shell disposed about a central, essentially unfunctionalized copolymer core.

4. The process of claim 1 wherein the partially functionalized ion-exchange resin has a volume average particle diameter of from about 125 to about 2000 μm.

5. The process of claim 1 wherein the copolymer beads have a volume average particle diameter of from about 100 to about 1600 μm.

6. The process of claim 1 wherein the copolymer beads are prepared from at least one monovinylidene monomer and a cross-linking monomer.

7. The process of claim 6 wherein the at least one monovinylidene monomer is styrene.

8. The process of claim 6 wherein the at least one monovinylidene monomer is vinylbenzylchloride.

9. The process of claim 6 wherein the cross-linking monomer is divinylbenzene.

10. The process of claim 6 wherein the cross-linked copolymer beads comprise from about 88 to about weight percent of the at least one monovinylidene monomer and from about 0.5 to about 12 weight percent of the cross-linking monomer, based on total weight of the monomers employed.

11. The process of claim 1 wherein the cross-linked copolymer beads are macroporous.

12. The process of claim 1 wherein the cross-linked copolymer beads are of a gel copolymer.

13. The process of claim 1 wherein the cross-linked copolymer beads have a $\beta$ of from about 1.5 to about 10 wherein $\beta$ is defined by the formula $$\beta = \frac{V_r}{V_p}$$

wherein: $V_r$ is the volume of a copolymer bead which is substantially completely functionalized with ion-exchange groups and swollen with a solvent, typically water; and $V_p$ is the volume of the unreacted copolymer bead.

14. The process of claim 1 wherein the cross-linked copolymer beads have a $\beta$ of from about 3 to about 5 wherein $\beta$ is defined as in claim 13.

15. The process of claim 1 wherein the ion-exchange groups are cation-exchange groups, anion-exchange groups, or chelate-exchange groups.

16. The process of claim 1 wherein the ion-exchange groups are sulfonic acid groups.

17. The process of claim 1 wherein the partially functionalized ion-exchange resin has from about 10 to about 90 percent of the capacity of an otherwise similar resin which is substantially completely functionalized with the ion-exchange groups.

18. The process of claim 1 wherein the partially functionalized ion-exchange resin has from about 30 to about 70 percent of the capacity of an otherwise similar resin which is substantially completely functionalized with the ion-exchange groups.

* * * * *

UNITED STATES PATENT AND TRADEMARK OFFICE
CERTIFICATE OF CORRECTION

PATENT NO. : 5,081,160
DATED : January 14, 1992
INVENTOR(S) : R.M. Strom, N.N. Westphal, A. Dorta, W.I. Harris, R.E. Gaidos It is certified that error appears in the above-identified patent and that said Letters Patent is hereby corrected as shown below:

In Column 17, Lines 27-28, "about 88 to about weight" should correctly appear as --about 88 to about 99.5 weight percent--.

Signed and Sealed this

First Day of June, 1993

Attest:

MICHAEL K. KIRK

Attesting Officer

Acting Commissioner of Patents and Trademarks